Nov. 15, 1966       E. W. THRASHER            3,285,302
                   CIRCULAR SAW MACHINE
Original Filed Feb. 11, 1963              3 Sheets-Sheet 1

INVENTOR.
ELBRIDGE W. THRASHER
BY
Mellin and Hanscom
ATTORNEYS

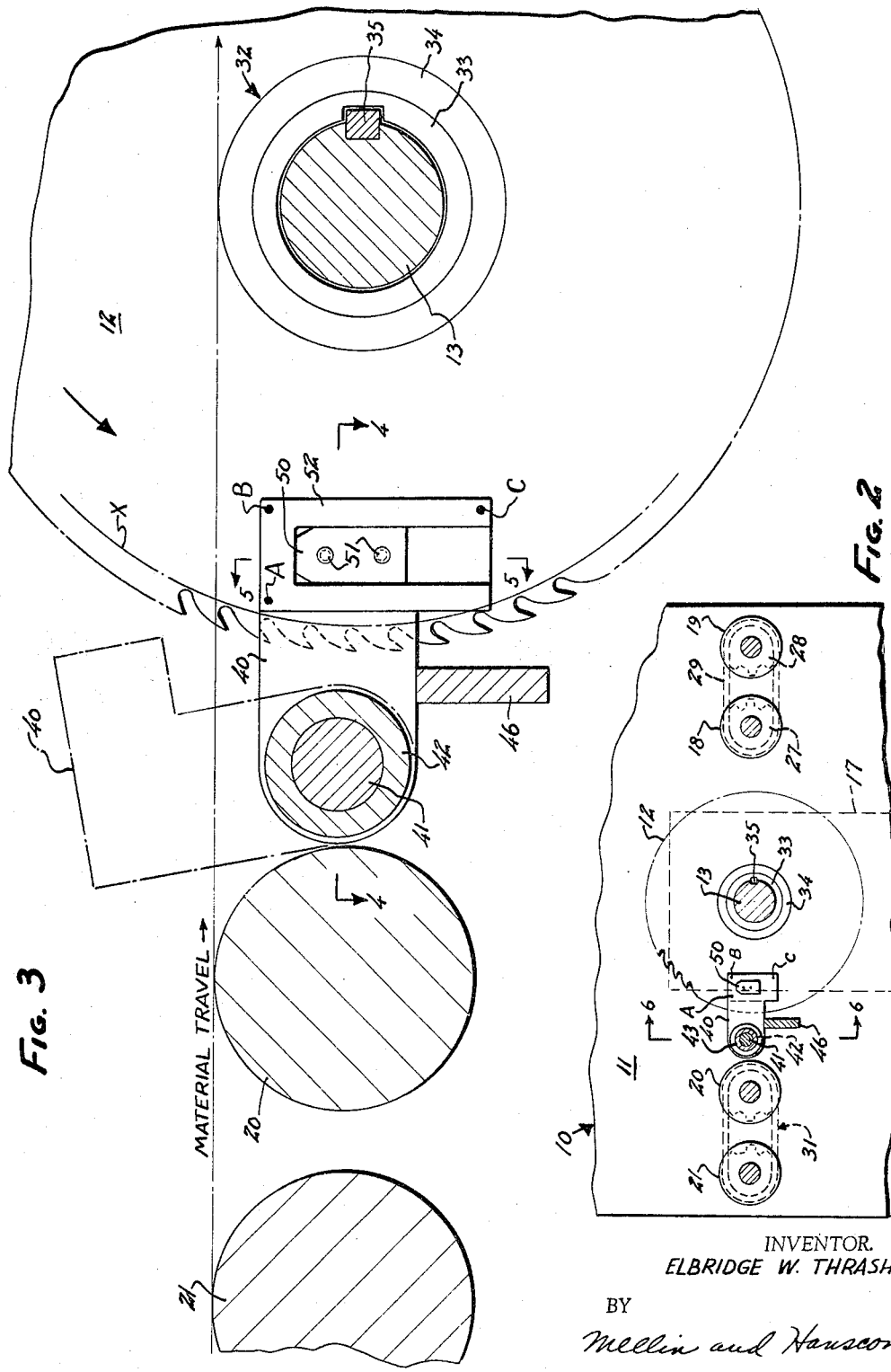

Nov. 15, 1966  E. W. THRASHER  3,285,302
CIRCULAR SAW MACHINE
Original Filed Feb. 11, 1963  3 Sheets-Sheet 3

INVENTOR.
ELBRIDGE W. THRASHER
BY
Mellin and Hanscom
ATTORNEYS

3,285,302
CIRCULAR SAW MACHINE
Elbridge W. Thrasher, 19541 Red Berry Drive,
Los Gatos, Calif.
Continuation of application Ser. No. 257,628, Feb. 11, 1963. This application Apr. 30, 1965, Ser. No. 456,881
9 Claims. (Cl. 143—37)

This invention relates to saw machinery and is of particular use in the lumber industry. The invention more especially involves an arrangement for circular saws including a spacing guide means which permits considerable saving in lumber as a result of smaller saw kerfs and of an increase in accuracy of cutting.

This is a continuation of application Serial No. 257,628, filed February 11, 1963, now abandoned, by Elbridge W. Thrasher, for Circular Saw Machine.

It is to be recognized that the value of timber and logs has been steadily increasing. In the past twenty years alone the value of stumpage in some areas of the United States has increased by a factor of at least 20. For this reason, the amount of usable lumber which can be obtained from a given log is of increasing importance.

The machinery used in present day lumber mills is substantially identical to the machinery used for the last twenty years. It is of particular note that there has been little or no change in the tooth width of circular saws, and for this reason the percentage of material wasted by using standard saw kerfs is the same. Although the loss of waste of a single saw kerf may not be regarded as significant, the loss is magnified by the number of cuts customarily taken in sawing a log and the total saving represents a major difference in the number of usable pieces which can be obtained. Importantly, it is to be recognized that where accuracy is increased the saving effected by using relatively small saw kerfs is much greater than the mere sum total of savings per cut.

Although it is desirable to use a saw blade of minimum thickness so as to minimize the resulting kerf, there is a practical limitation under customary machine setups since the thinner saw blades possess inherently greater flexure. If the flexure is too great, the blade may not hold a true cutting line, since the grain of the lumber, knots therein, and foreign material all affect the trueness of cut by forcing the blade axially of its rotation. Conventional saw blade thicknesses have been established and are somewhat standardized by these factors, but taking into consideration only the standard or customary machine setups.

The present invention contemplates a novel circular saw machine and setup permitting the use of saw blades of unusual thinness for a given operation. More particularly, it has been discovered that the conventional thickness of circular saws may be reduced for any given operation by providing a machine setup that allows the blade to float axially to some small degree upon its arbor. The blade is then restrained laterally by a guide means having points of supporting contact on either side of the blade and proximate the gullet line or inner tooth edge of the saw blade. A machine setup of this type will reduce blade flexure in lateral or axial directions, thereby avoiding blade distortions which would impair cutting operations and result in a lack of control.

This invention further contemplates the use of guide means that includes points of contact on either side of a saw blade to define guide planes which are normal to the axis of blade rotation. Such a guide means will possess points of contact arranged both radially inward and vertical relative to points of contact proximate the gullet line. In operation the blade will then be more effectively guided and restrained against bending at the cutting edge, the collar of said blade being able to follow with axial movement along the supporting arbor so as to follow displacements of the leading tooth edge of the saw blade.

It has been found that the present invention will not only produce lumber savings as a direct result of using smaller saw kerfs, but further savings are derived from an increase in accuracy of cutting. With increased cutting accuracy, it is possible to make roughing cuts closer to the desired size of the surfaced lumber. Therefore, there will be a larger recovery of usable lumber from any given log.

A further advantage of the present invention is the ability to use saw collars of reduced axial thickness. Formerly, it was impractical to make battery cuts with high production machines and spacings between saws with less than four inches, except by the use of saws formed of heavy gauge material and possessed of wide kerfs. This is particularly true since the saw blades were laterally stabilized by the saw collars themselves. An apparatus setup according to the present invention is much less dependent upon the axial thickness of the collars and, in fact, it has been found that battery cuts may be taken using collar sizes of three inches and even collars as narrow as ¾ inch. The means that saw blades may be ganged together in a battery with less than a one inch spacing rather than approximately four inches. It follows, therefore, that a battery type cutting operation can be used successfully with relatively light gauge saws to form lumber sizes less than three inches, as well as larger widths.

Certain structures used in connection with the present invention have also been used in machines commonly known as "shiftable edgers." These machines are comprised of one or more circular saw blades, each blade mounted by a saw collar upon an arbor and having a pair of lateral guides for positioning the saw blade along the arbor to provide adjustable spacing or positioning of a saw blade. In some instances the saw guides contact the saw blades near their peripheral edge but radially inward of the gullet line. Such guides hold the saws to a given plane of rotation while also allowing the saw collar and the central portion of each blade to be adjustably moved along the supporting arbor. Exemplary teachings of this kind can be found in U.S. Patents Nos. 201,198, 523,298 and 2,149,235. Importantly, none of these patents nor any other known prior art teaching uses a machine setup of the type described herein where each lateral guide provides one or more limiting points of contact proximate to the gullet line of the saw blade. This feature of the present invention is exceedingly important to the manner in which relatively thin saw blades are controlled during the cutting operation, which is to be distinguished from the mere positioning of a saw blade along its supporting arbor.

In view of the above brief description, it will be seen that a primary object of this invention is to provide a circular saw machine capable of using saw blades of smaller thickness for a given operation than previously considered possible, and as a result of which a greater amount of lumber may be obtained from a given log.

Another object is to provide apparatus of the kind described for controlling and guiding a circular saw blade that will inhibit blade distortion and result in increased cutting accuracy over the accuracy of conventional machine setups.

Another object of the invention is to provide saw blades having floating saw collars of reduced axial thickness.

Another object is to provide an apparatus which will reduce the amount of blade distortion which normally results in a sawing operation, thereby permitting a smaller blade thickness to be used.

A further object of the invention is to provide apparatus of the kind described which can be easily set up and adjusted to cut lumber of several different sizes.

A still further object is to provide guide means including replaceable contact blocks of predetermined size which may be substituted for worn blocks, thereby maintaining accuracy.

Other objects of this invention will become apparent in view of the drawings and the following detailed description.

In the drawings forming a part of this application and in which like parts are identified by like reference numerals throughout the same.

FIG. 2 is a section taken on lines 2—2 of FIG. 1;

FIG. 3 is an enlarged section of a portion of the machine taken on lines 3—3 of FIG. 1;

Figure 1:
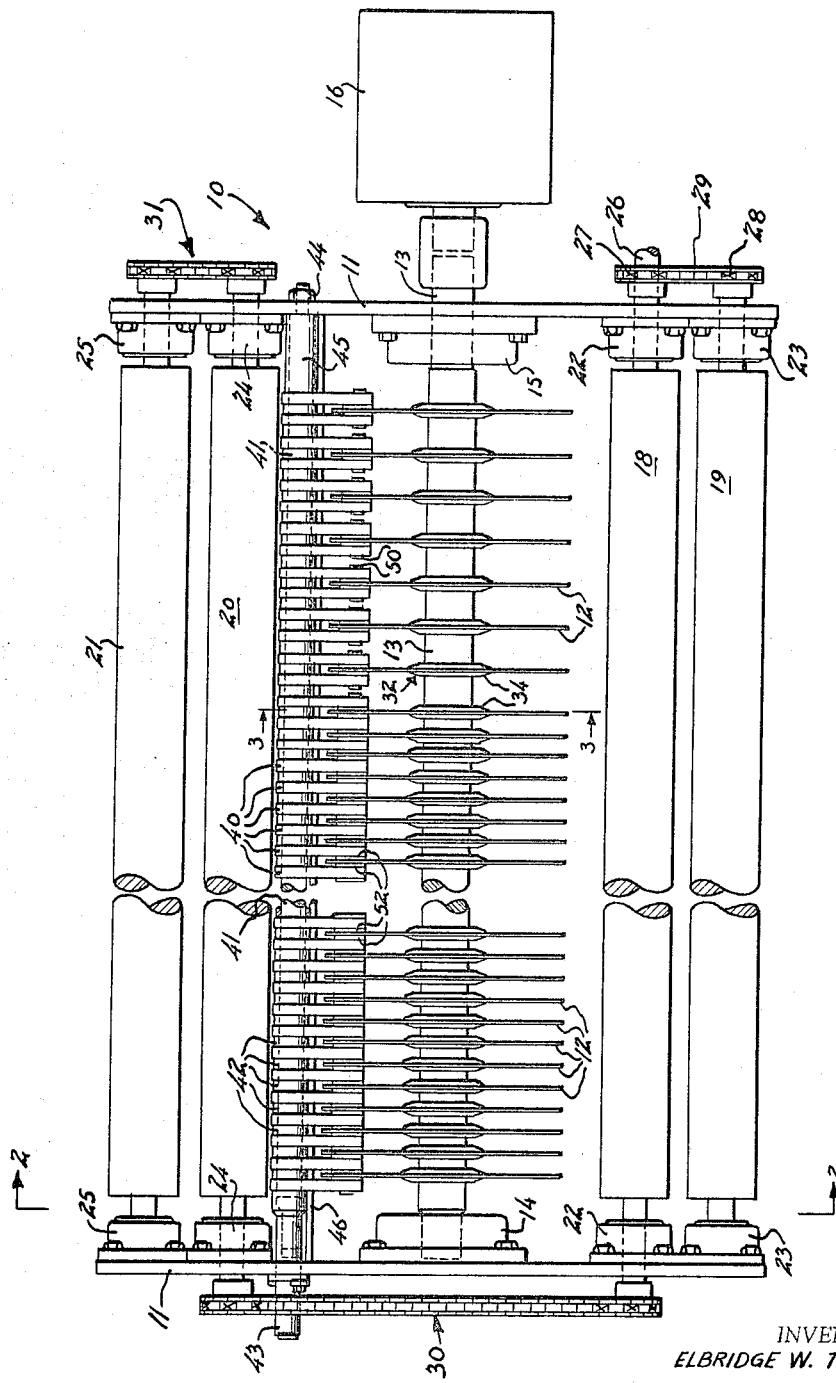
FIG. 1 is a plan view of one embodiment for a circular saw machine and related apparatus as contemplated by this invention.

Referring to FIG. 1, there is shown one embodiment of the invention in a lumber sawing machine 10 comprising a framework 11 and a battery of saw blades 12, each mounted upon and keyed to a rotatable arbor 13. Arbor 13 is supported in bearings 14 and 15 and is driven by a motor 16.

Machine 10 further comprises a plurality of conveyor rollers 18, 19, 20 and 21 supported from pairs of bearings 22, 23, 24 and 25 secured to framework 11. Rollers 18 and 19 are disposed on the trailing side of blades 12 and are driven with substantially uniform peripheral speed through a sprocket drive comprising a drive shaft 26, a pair of sprockets 27 and 28 and a chain belt 29. Rollers 20 and 21 are located on the leading side of blades 12 and are driven synchronously with rollers 18 and 19 by means of sprocket drives and belt connections, generally indicated by reference numbers 30 and 31. The general arrangement of rollers 18–21 may be regarded as conventional equipment for moving cants or flitches into a battery of saw blades and conveying the cut lumber through and past the blades.

Importantly, and unlike conventional saw machinery having a battery of circular saw blades, blades 12 are axially movable along arbor 13 and have a floating looseness in either axial direction. For this purpose, it is essential that there be suitable clearance between the arbor 13 and the I.D. of collars 32 to permit the blades to be moved axially while they are being rotated. Nevertheless, collars 32 may be of standard construction, comprising a flanged and threaded tubular stud 33 and a matable flanged and threaded nut 34. Also, tubular stud 33 has an internal keyway for receiving a key 35 or a spline provided on the arbor 13, as shown in FIG. 3.

This invention is especially directed to that part of machine 10 that defines a guide means for limiting and controlling the movement of blades 12 axially along arbor 13 during sawing operations. Referring again to FIG. 1, this guide means comprises a plurality of finger members 40 having contact surfaces for engaging the sides of blades 12. Members 40 are pivotally mounted along a support rod 41, which extends substantially parallel to arbor 13, and the finger members are separated in fixed predetermined relationship by spacer collars 42 and in a manner such that the arms are interdigitated with blades 12. The entire assembly of finger members 40 and spacer collars 42 is disposed on rod 41 between a socket nut 43 at one end and a nut 44 at the other. A spacer sleeve 45 is provided intermediate framework 11 and the first finger member on the right, as seen on FIG. 1, to position the finger assembly (and blades 12) relative to the framework.

Although finger members 40 are pivotally mounted upon rod 41, a bar 46 is provided beneath the finger members for laterally supporting each in a position as shown in FIG. 3. But to rearrange the interdigitation of fingers 40 with blades 12 or to remove or replace saw blades 12, finger members may be pivoted into an alternate position as indicated by the broken lines of FIG. 3. Such a construction permits free axial removal of the blades by first lifting fingers 40 into their alternate positions and without requiring a disassembly of the guide means. Moreover, it will be apparent that the interdigitation of finger members 40 with blades 12 and spacer members can be easily changed if a different arrangement of spacing between guide surfaces is desired. As for example, and again referring to FIG. 1, it will be seen that blades 12 have been arranged in first and second batteries of different spacing by interdigitating a single finger member between adjacent blades on the left and two finger members between adjacent blades on the right. Should it be desired that all blades of machine 10 be equally spaced apart, then the finger members can be removed and relocated between adjacent blades after said blades have been axially adjusted along arbor 13.

Figure 5:
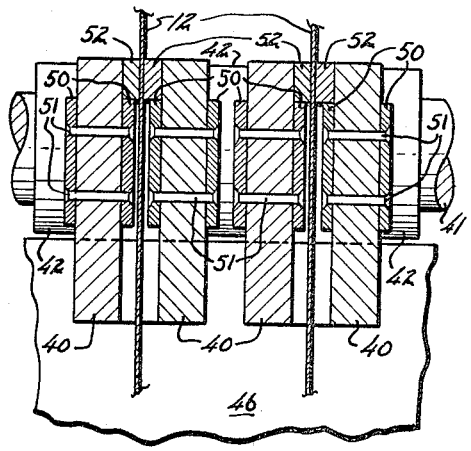
FIG. 5 is a section taken on lines 5—5 of FIG. 3.
Figure 4:
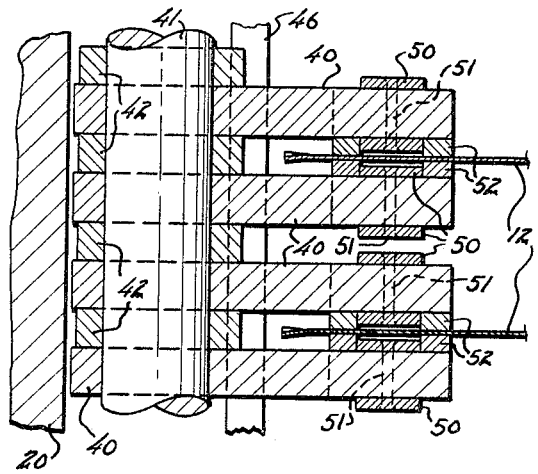
FIG. 4 is a section taken on lines 4—4 of FIG. 3.
Figure 6:
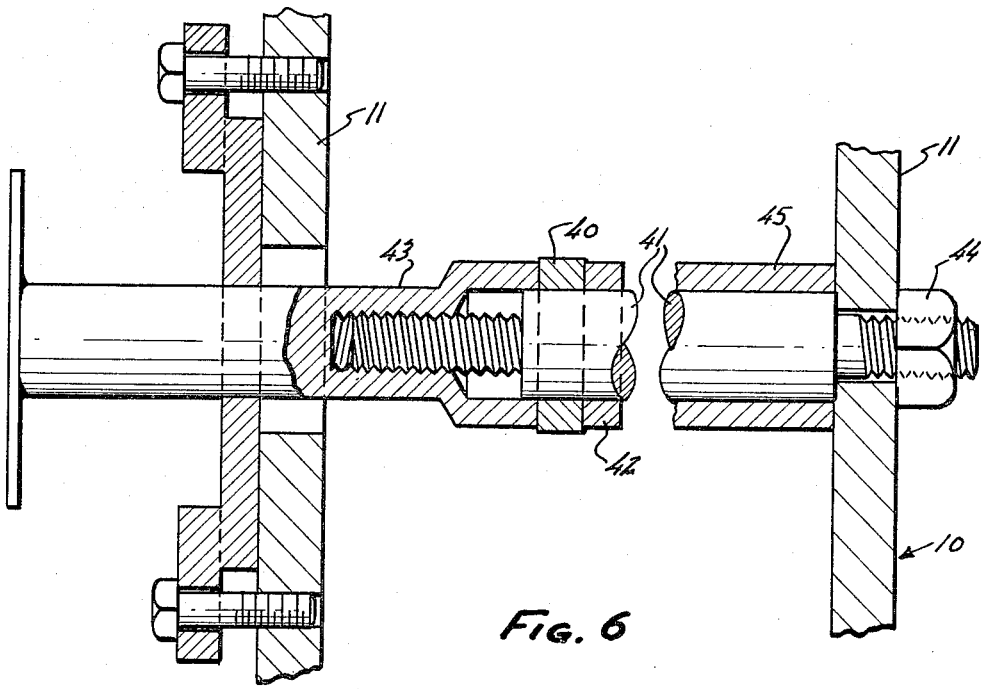
FIG. 6 is an enlarged broken section of the guide support rod taken on lines 6—6 of FIG. 2.

Referring to FIGS. 4 and 5, finger members 40 include replaceable bearing guide surfaces located in juxtaposed relationship to the sides of blades 12. For this purpose, each finger member includes a pair of support plates 50 mounted on opposite sides of the fingers by a pair of through bolts 51. The top edges of plates 50 are tapered upward to serve as a guide for a replaceable bearing block 52 having a generally U-shaped configuration. Each bearing block is freely supported upon the top edge of a plate 50 and is held upon the plate by its confinement between the adjacent saw blade 12 and its supporting plate 50. The width between legs of the U-shaped blocks is preferably the same but slightly larger than the lateral dimension of the supporting plates 50 to prevent any possible inadvertent dislodgement.

Bearing blocks 52 may be formed of various kinds of material. However, from the standpoint of low replacement cost it has been found that plywood is particularly useful. In addition, plywood blocks are easily shaped to a predetermined size and thickness to give predictable accuracy in the clearance between the blade confining surfaces of cooperating adjacent blocks.

It is important to note that the permissible contact surfaces of blocks 52 include points of contact, such as point A, proximate the gullet line X of blade 12, in order to establish almost immediate lateral control of the blade as material is fed by the rollers 20 and 21 into the cutting teeth of the saw. Furthermore, the surface of contact should also include points of contact, such as points B and C, located respectively substantially closer toward the center of said saw blade and substantially displaced vertically relative to point A. This arrangement of contact points will determine and define a limiting plane of movement.

Figure 7:
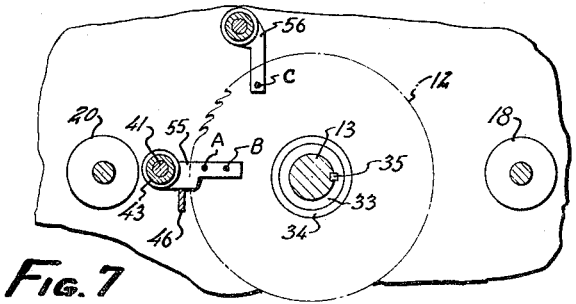
FIG. 7 is a diagrammatic view and vertical section of a modified guide arrangement for a circular saw.

In larger diameter saws, as for example saws greater than 24" diameter, guide means or blocks may be disposed near the top or the uppermost peripheral edge of the saw blades to give lateral support above the cut. FIG. 7 of the drawings diagrammatically illustrates the use of guide means of this type where a blade 12 is laterally supported by a guide block 55 having contact points A and B and a guide block 56 which provides a contact point C displaced vertically relative to point A. The point of contact C should be on the forward side of the blade and preferably close to the gullet line of the blade. The contact blocks 55 and 56 may be mounted in a manner similar to the mounting of bearing blocks 52, and they should also be replaceable by similar blocks of predetermined size and thickness when original block becomes overly worn.

The surfaces of blade contact which limit the movement of any given saw blade should be spaced apart a distance greater than the thickness of the blade by a reasonable clearance. It has been found that a clearance of .005 inch is sufficient to prevent binding under most conditions of operation and even lesser clearances may be used. In any event, it will be evident that the contact surfaces of blocks 52 will wear in time and the clearance will become greater than originally provided. Eventually the contact surfaces will be worn to the extent that the original accuracy and control over lumber thickness is somewhat impaired. When this occurs the worn guide blocks 52 should be replaced with guide blocks of predetermined size. Using a mounting such as shown, it will be evident that the replacement of worn guide blocks may be accomplished with very little effort since they are merely supported upon the top edge of plates 50.

In operation, blades 12 are rotatably driven upon their supporting arbor 13 while the axial position of the blade collars 32 is determined by the limitation imposed by the respective surface engagement between the sides of each blade and the contact established with adjacent blocks 52. In the event that the teeth of a saw blade come into contact with material (which might tend to bend the blade), as for example a wood knot or a rock, or if the grain of the wood being cut tends to bend the blade, the blade collar 32 will move independently of other blades and axially in the direction of the movement of the blade's peripheral edge. The resulting blade action is one where the center portion of the blade always follows the deviated axial movement of the blade's periphery, and as a consequence blade distortions are minimized if not eliminated. As a result of the unusual blade control, it has been found that thinner blades having a much smaller saw kerf can be used without impairing the cutting action. Furthermore, experience has shown that a greater accuracy and uniformity of cut is possible. This can be attributed in part to the reduced friction between the cut material and the blade, which results from the body of the blade following in the cut. This, of course, lessens the chance that the blade will become heated and warp.

Although it may be regarded as obvious, the use of saw blades of reduced width and kerf will place higher cutting pressures upon each tooth unless the number of teeth is substantially increased. Accordingly, in practicing the invention herein described and where the saw kerf is reduced from conventional sizes, it has been found desirable if not necessary to increase the number of teeth for a given diameter of saw blade. For example, a conventional edger saw of 22 inches diameter having a kerf greater than ¼ may have 20 teeth. If the size of the kerf is reduced to ⅛ inch the number of teeth should be approxiamtely doubled to prevent an exceptional loss of teeth, assuming similar operating conditions.

It is to be understood that while a preferred form of this invention is illustrated and described, various changes may be made without departing from the spirit of the invention or the scope of the attached claims, and each of such changes is contemplated.

Having thus described my invention, what I claim and desire to secure by Letters Patent is:

1. An edger machine comprising: a rotatable arbor; a circular saw blade; means for mounting said blade to said arbor while allowing the blade to be moved axially thereon with a floating looseness during use; and a saw guide located on the leading side of said saw blade and having points of contact that define a limiting control plane, said saw guide providing points of contact on opposite sides of said blade and locating proximate to the gullet line of the saw blade; whereby said saw guide holds the peripheral cutting edge of said blade on line while said means for mounting said blades to said arbor allows the saw collar to move axially and follow the cutting plane of said cutting edge.

2. The apparatus of claim 1 wherein said saw guide comprises: a pair of replaceable wear guides of predetermined thickness, said wear guides being replaceable when worn with wear guides of identical thickness for maintaining a desired clearance with the saw blade.

3. The apparatus of claim 1 wherein said saw guide provides only continuous lines of contact extending from a point approximately opposite the gullet line of the saw blade to points radially inward thereof.

4. The apparatus of claim 1 wherein said saw guide comprises a pair of support arms, said arms being located on opposite sides of said saw blade and having a supporting edge extending laterally toward the saw blade; said guide further comprising a pair of replaceable wear guides of predetermined thickness supported upon the supporting edges of said support arms, respectively, each wear guide being confined between its support arm and the saw blade.

5. The apparatus of claim 4 wherein said replaceable wear guides provide only continuous lines of contact extending from a point approximately opposite the gullet line of the saw blade to points radially inward thereof.

6. The apparatus of claim 4 wherein said pair of replaceable wear guides is formed with a generally U-shape but supported in inverted positions over said supporting edges, respectively.

7. An edger machine comprising: a rotatable arbor; a circular saw blade keyed to said arbor; and a saw guide located on the leading side of said saw blade, said saw guide comprising a pair of support arms located on opposite sides of said saw blade, each arm having a supporting edge extending laterally toward the saw blade, said saw guide further comprising a pair of replaceable wear guides of predetermined thickness supported upon the supporting edges of said support arms, respectively, each wear guide being confined between its support arm and the saw blade.

8. The apparatus of claim 7 wherein said pair of replaceable wear guides is formed with a generally U-shape but supported in inverted positions over said supporting edges, respectively.

9. In a saw machine having a saw blade, a saw guide comprising: a pair of support arms located on opposite side of said saw blade, each arm having a supporting edge extending laterally toward the saw blade and providing a seat for a wear guide; and a pair of replaceable wear guides of predetermined thickness, one wear guide being freely supported upon the supporting edge of one support arm, respectively, and each wear guide being confined between its support arm and the saw blade.

References Cited by the Examiner
UNITED STATES PATENTS

| | | | |
|---|---|---|---|
| 201,198 | 3/1878 | Randolph | 143—37 |
| 2,149,235 | 2/1939 | Stone | 143—37 |

WILLIAM W. DYER, Jr., *Primary Examiner.*

W. D. BRAY, *Assistant Examiner.*